US012631555B1

(12) United States Patent (10) Patent No.: US 12,631,555 B1
Shalaby (45) Date of Patent: May 19, 2026

(54) FLUID IMAGING BASED ON OPTICAL COHERENCE TOMOGRAPHY

(71) Applicant: IMAM MOHAMMAD IBN SAUD ISLAMIC UNIVERSITY, Riyadh (SA)

(72) Inventor: Mohamed Yehia Mohamed Shalaby, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/041,765

(22) Filed: Jan. 30, 2025

(51) Int. Cl.
    *G01N 21/53* (2006.01)
    *G01N 21/47* (2006.01)

(52) U.S. Cl.
    CPC .......... *G01N 21/53* (2013.01); *G01N 21/474* (2013.01); *G01N 21/4795* (2013.01); *G01N 2021/4742* (2013.01); *G01N 2021/4752* (2013.01); *G01N 2021/4769* (2013.01); *G01N 2021/4797* (2013.01); *G01N 2201/0853* (2013.01)

(58) Field of Classification Search
    CPC .. G01N 21/53; G01N 21/474; G01N 21/4795; G01N 2021/4742; G01N 2021/4752; G01N 2021/4769; G01N 2021/4797; G01N 2201/0853
    See application file for complete search history.

(56) References Cited

U.S. PATENT DOCUMENTS 5,551,278 A * 9/1996 Rounbehler ........... G01V 9/007
    96/101
2009/0091757 A1 4/2009 Yang 2012/0127475 A1 * 5/2012 Wax ................... G01B 9/02088
    356/479
2013/0217141 A1 * 8/2013 Lenhard ................ B01L 3/5453
    436/164
2015/0245768 A1 9/2015 Hasegawa et al.
    (Continued)

FOREIGN PATENT DOCUMENTS

CN 109642195 A * 4/2019 ............ C12M 31/10
KR 102598511 B1 * 11/2023 ......... G01N 21/8851

OTHER PUBLICATIONS

Antti I. Koponen, et al., Analysis of Industry-Related Flows by Optical Coherence Tomography—A Review†, Kona Powder and Particle Journal, vol. 37, 2020, pp. 42-63, 22 pages.

*Primary Examiner* — Tri T Ton
(74) *Attorney, Agent, or Firm* — Oblon, McClelland, Maier & Neustadt, L.L.P.

(57) ABSTRACT

A fluid imaging system includes a pipe with at least one fluid therein and a substantially circular circumference including a first half circumference and a second half circumference. Optical heads are distributed along an exterior wall of the first half circumference. A light source is configured to emit a source light. A timing circuit including an optical switch serially activates the optical heads, resulting in one active optical head at a time. A fiber circulator directs the source light to the active optical head and collect reflected light from the pipe and the at least one fluid therein. A detector receives the reflected light from the fiber circulator and generate spectral data. A controller processes the spectral data by a Fourier-transform algorithm to provide cross-sectional analysis of multi-phase fluid flow of the at least one fluid along the pipe.

17 Claims, 10 Drawing Sheets

(56)  References Cited

U.S. PATENT DOCUMENTS

| | | | |
|---|---|---|---|
| 2015/0265152 A1 | 9/2015 | Feldman et al. | |
| 2015/0377656 A1* | 12/2015 | Bastianini | G01D 5/35364 |
| | | | 356/300 |
| 2018/0042513 A1* | 2/2018 | Connor | A61B 5/369 |
| 2019/0056315 A1 | 2/2019 | Kinrot et al. | |
| 2023/0043791 A1* | 2/2023 | Supikov | G03H 1/0866 |

* cited by examiner

FLUID IMAGING BASED ON OPTICAL COHERENCE TOMOGRAPHY

BACKGROUND

Technical Field

The present disclosure is directed to fluid flow analysis systems and methods, and more particularly to optical imaging systems for non-invasive monitoring of multiphase fluid flows in pipelines utilizing Fourier Domain Optical Coherence Tomography (FD-OCT) techniques.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Electrical capacitance tomography (ECT) is a non-invasive imaging technique that reconstructs the permittivity distribution within a region by measuring small capacitance changes across multiple electrodes. ECT has been applied extensively in industrial processes, particularly for multiphase flow imaging, owing to its low cost and ability to operate in harsh environments. However, ECT systems face limitations, such as poor spatial resolution and slow data acquisition rates. For instance, increasing electrode size improves sensitivity but sacrifices localization accuracy, resulting in measurements that represent an integrated section rather than a true cross-section of the pipe [Wang, F.; Marashdeh, Q.; Fan, L.-S.; Warsito, W. *Electrical Capacitance Volume Tomography: Design and Applications. Sensors* 2010, 10, 1890-1917; K. J. Alme and S. Mylvaganam, "*Electrical Capacitance Tomography—Sensor Models, Design, Simulations, and Experimental Verification,*" in *IEEE Sensors Journal*, vol. 6, no. 5, pp. 1256-1266 October 2006].

In particular, in ECT systems, inter-electrode capacitances take relatively long to measure. This limits the ability to capture real-time flow dynamics in fast-moving fluids, making ECT unsuitable for applications in reactors or high-speed industrial flows. Existing imaging systems are not suited for very fast fluid flows in reactors or similar industrial processes, either due to slow acquisition times or insufficient resolution. Further, to achieve better sensitivity, ECT systems require longer electrodes. However, this results in measurements that do not correspond to specific cross-sectional areas but instead to integrated regions beneath the electrodes, reducing the spatial axial resolution and accuracy of the imaging. Furthermore, ECT systems struggle to provide high-resolution imaging, particularly for multiphase flows where distinct structural details and compositional distributions are critical.

Optical coherence tomography (OCT) is an optical imaging technology based on low-coherence interferometry, capable of achieving micrometer-scale resolution. In Fourier-domain OCT (FD-OCT), spectral interferograms are analyzed to achieve faster acquisition and higher sensitivity compared to time-domain systems. OCT's speed and precision have made it indispensable in fields such as ophthalmology and cardiology, and its potential for industrial applications is rapidly expanding [Drexler W, Fujimoto JG (2008) *Optical Coherence Tomography: Technology and*

*Applications, Springer*; Bouma B E, Yun S H, Vakoc B J, Suter M J, Tearney G J (2009) *Fourier-domain optical coherence tomography: recent advances toward clinical utility, Current Opinion in Biotechnology* 20 (1): 111-8].

The application of OCT technology has expanded into non-destructive testing and real-time imaging in industrial settings. Applications include layer thickness measurement, defect detection, and quality control in manufacturing processes. The ability to capture high-resolution cross-sectional images makes OCT particularly well-suited for tasks like paint thickness analysis and microstructural characterization in materials science [Bouma et al. (2009) *Fourier-domain optical coherence tomography: recent advances toward clinical utility. Curr Opin Biotechnol.* 2009 February;20 (1): 111-8; Schmitt JM (1999) *Optical coherence tomography (OCT): a review, IEEE Journal of Selected Topics in Quantum Electronics* 5 (4): 1205-1215].

Several patented technologies and research studies have aimed to enhance ECT and OCT systems. Innovations in ECT focus on improving electrode designs and algorithms to mitigate the "soft-field" effect, as described by Wang et al. (2010) [Wang F, Marashdeh Q, Fan LS, Warsito W (2010) *Electrical Capacitance Volume Tomography: Design and Applications, Sensors* 10:1890-1917;], while OCT advancements emphasize expanding industrial applicability through enhanced hardware and faster image processing. The existing OCT systems primarily utilize Doppler-based techniques for flow velocity measurement but do not address the imaging of structural characteristics in cross-sectional flows [Wang F, Marashdeh Q, Fan LS, Warsito W (2010) *Electrical Capacitance Volume Tomography: Design and Applications, Sensors* 10:1890-1917; Drexler and Fujimoto (2008), *Optical Coherence Tomography: Technology and Applications, Springer; Schmitt* (1999), "*Optical coherence tomography (OCT): a review,*" in *IEEE Journal of Selected Topics in Quantum Electronics*, vol. 5, no. 4, pp. 1205-1215].

US20190056315A1 describes a spectrometer system including a light source and a spectrometer. The light source can include a laser or light-emitting diode (LED). An optical head can be positioned horizontally and fixed. Fourier transforms may be formed at the image plane. While this reference employs Fourier transforms, it lacks the capability for serial activation of multiple optical heads for cross-sectional fluid analysis.

US20150245768A1 describes an optical probe including an optical fiber, an optical connecter connected to the optical fiber, a focusing optical system and a deflection optical system each connected to the optical fiber, a support tube and a jacket tube each surrounding the optical fiber to extend along the optical fiber, and a buffer fluid filled in the inner lumen of the jacket tube. This reference does not provide synchronized timing control of multiple optical heads for systematic pipe circumference scanning.

US20090091757A1 discloses a chromatographic system that includes a light source and an imaging and analysis system for detecting particle size and analyzing other characteristics of particles in the effluent of a filtration column while filtration is ongoing. The method can include flowing an effluent through a tube; illuminating at least a portion of the effluent in the tube with light; and sensing a portion of the light scattered by the particles in the tube to provide light-scattering data. This reference does not implement distributed optical heads with coordinated activation for cross-sectional fluid imaging.

Each of the aforementioned references suffers from one or more drawbacks hindering their adoption, such as limited spatial resolution, insufficient measurement speeds for industrial flow monitoring, inability to simultaneously capture structural and dynamic flow characteristics, challenges in maintaining measurement accuracy across varying environmental conditions, and complexity in deployment for continuous industrial monitoring. These limitations particularly impact applications requiring real-time analysis of multiphase flows in industrial pipelines, where cross-sectional imaging and high temporal resolution are desirable. Accordingly, it is one object of the present disclosure to provide a fluid imaging system that achieves enhanced spatial resolution and measurement speed while maintaining operational robustness in industrial environments. The present disclosure addresses these limitations by introducing a system based on FD-OCT technique to capture cross-sectional images of multi-phase fluid flow with high speed in pipes, offering high spatial resolution and ambient noise immunity in harsh environments.

SUMMARY

In an exemplary embodiment, a fluid imaging system includes a pipe configured to receive at least one fluid therein and having a substantially circular circumference including a first half circumference and a second half circumference; optical heads distributed along an exterior wall of the first half circumference; a light source configured to emit a source light; a timing circuit including an optical switch and configured to serially activate the optical heads via the optical switch, resulting in one active optical head at a time; a fiber circulator configured to direct the source light to the one active optical head and collect reflected light from the pipe and the at least one fluid therein; a detector configured to receive the reflected light from the fiber circulator and generate spectral data; and a controller configured to process the spectral data by a Fourier-transform algorithm to provide a cross-sectional analysis of multiphase fluid flow of the at least one fluid along the pipe.

In some embodiments, the one active optical head is configured to receive the source light from the fiber circulator, illuminate a corresponding localized region of the pipe, and direct the reflected light to the fiber circulator.

In some embodiments, the timing circuit is configured to serially activate the optical heads so that a series of localized regions along the first half circumference of the pipe are imaged.

In some embodiments, the first half circumference and the second half circumference of the pipe are opposite to each other.

In some embodiments, the first half circumference is 170-190 degrees of the pipe, the second half circumference is 170-190 degrees of the pipe, and the first half circumference and the second half circumference together are 360 degrees of the pipe.

In some embodiments, the optical heads are each oriented substantially perpendicular to the exterior wall of the first half circumference.

In some embodiments, the optical heads are collimating optical heads.

In some embodiments, the light source includes a superluminescent diode (SLED) configured to emit incoherent light or partially coherent light as the source light, and the detector includes an optical spectrum analyzer.

In some embodiments, the light source includes a tunable laser source, and the detector includes a photodetector.

In some embodiments, the at least one fluid includes air and a liquid, and the pipe includes glass.

In some embodiments, the controller is configured to provide visualization of flow structures, boundary layers, a dielectric constant distribution or a combination thereof.

In some embodiments, the fluid imaging system further includes a coating formed over an exterior wall of the second half circumference and configured to absorb infrared light.

In some embodiments, the fluid imaging system further includes a power divider configured to divide the source light substantially equally for the optical heads.

In some embodiments, the fluid imaging system further includes a semiconductor optical amplifier (SOA) optically positioned between the fiber circulator and the detector.

In another exemplary embodiment, a fluid imaging system includes a pipe configured to receive at least one fluid therein and having a substantially circular circumference including a first half circumference and a second half circumference; an optical head positioned over an exterior wall of the first half circumference; a robotic arm configured to move the optical head along the exterior wall of the first half circumference; a light source configured to emit a source light; a fiber circulator configured to direct the source light to the optical head and collect reflected light from the pipe and the at least one fluid therein; a detector configured to receive the reflected light from the fiber circulator and generate spectral data; and a controller configured to process the spectral data by a Fourier-transform algorithm to provide cross-sectional analysis of multi-phase fluid flow of the at least one fluid along the pipe.

In some embodiments, the robotic arm is configured to move the optical head along the exterior wall of the first half circumference so that a series of localized regions along the first half circumference of the pipe are imaged.

In some embodiments, the robotic arm is configured to move the optical head along the exterior wall of the first half circumference and make stops at a series of locations along the exterior wall of the first half circumference so as to image the series of localized regions.

In some embodiments, the light source includes a superluminescent diode (SLED) or a tunable laser source, and the detector includes an optical spectrum analyzer or a photodetector.

In some embodiments, the fluid imaging system includes a single optical head.

In some embodiments, the at least one fluid includes air and a liquid, the pipe includes glass, and the controller is configured to provide visualization of flow structures, boundary layers, a dielectric constant distribution or a combination thereof.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

DETAILED DESCRIPTION

Figure 1:
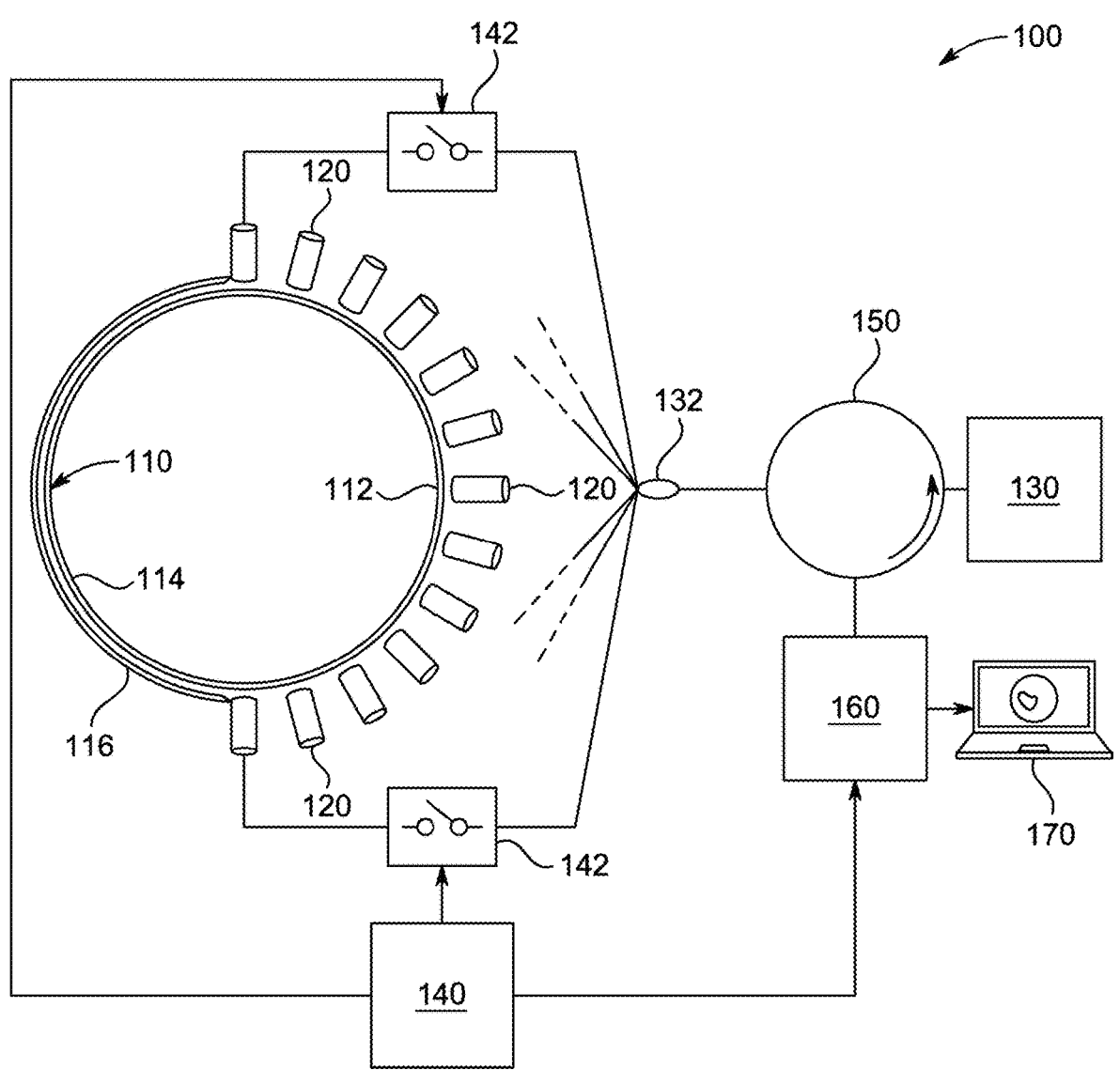
FIG. 1 is an exemplary schematic diagram of a fluid imaging system having an arrangement of multiple optical heads along a pipe circumference and associated optical components, and incorporating electronic scanning and spectral measurements, according to a first embodiment.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a fluid imaging system that integrates advanced optical measurement techniques with signal processing abilities to enable comprehensive analysis of fluid flows within industrial pipelines. The fluid imaging system employs non-invasive measurement principles to characterize multiphase fluid distributions and flow dynamics through high-resolution cross-sectional imaging. The fluid imaging system achieves simultaneous visualization of flow structures and boundary layers while maintaining measurement accuracy across varying operational conditions by combining optical sensing with synchronized data acquisition and real-time processing capabilities.

Referring to FIG. 1, illustrated is a schematic diagram of a fluid imaging system (as represented by reference numeral 100). The fluid imaging system 100 can be used for industrial pipeline monitoring applications. The fluid imaging system 100 has a multi-component configuration combining optical measurement principles, timing control, temporal resolution and signal processing techniques to enable comprehensive fluid flow analysis. The fluid imaging system 100 enables real-time visualization of multiphase flow distributions, characterization of flow structures and boundary layers and analysis of dynamic fluid behavior, providing insights for process monitoring, quality control, and system maintenance applications.

As illustrated in FIG. 1, the fluid imaging system 100 includes a pipe 110 configured to receive at least one fluid therein and having a substantially circular circumference including a first half circumference 112 and a second half circumference 114. Herein, the pipe 110 is designed for fluid containment and analysis. The pipe 110 incorporates a defined geometric configuration with a substantially circular circumference, subdivided into the first half circumference 112 and the second half circumference 114 for systematic measurements. The pipe 110 receives and contains the at least one fluid therein, enabling controlled flow analysis and measurement.

In some embodiments, the at least one fluid includes air/gas and a liquid, and the pipe 110 is at least partially made of a transparent material such as glass. Specifically, the at least one fluid contained within the pipe 110 includes a mixture of air/gaseous and liquid phases. The glass of the pipe 110 is not particularly limited. For example, the glass for the pipe 110 can be borosilicate glass.

Further, herein, the first half circumference 112 and the second half circumference 114 of the pipe 110 are opposite to each other. That is, the geometric configuration of the pipe 110 implements an orientation with the first half circumference 112 and the second half circumference 114 being positioned directly opposite to each other across its central axis. This opposing arrangement establishes complementary measurement and reference zones for the optical measurements. In particular, the opposite geometric arrangement of the first half circumference 112 and the second half circumference 114 of the pipe 110 enables systematic scanning and reference measurements across diameter of the pipe 110.

In present embodiments, the first half circumference 112 is 160-200 degrees (e.g. 160 degrees, 165 degrees, 170 degrees, 175 degrees, 180 degrees, 185 degrees, 190 degrees, 195 degrees, 200 degrees or any values therebetween) of the pipe 110. The second half circumference 114 is 160-200 degrees (e.g. 160 degrees, 165 degrees, 170 degrees, 175 degrees, 180 degrees, 185 degrees, 190 degrees, 195 degrees, 200 degrees or any values therebetween) of the pipe 110. The first half circumference 112 and the second half circumference 114 together are 340-360 degrees (e.g. 340 degrees, 345 degrees, 350 degrees, 355 degrees, 360 degrees or any values therebetween) of the pipe 110. Preferably, the first half circumference 112 spanning 170-190 degrees of the total circumference of the pipe 110 can provide extensive measurement coverage while maintaining practical implementation constraints while the second half circumference 114 spanning 170-190 degrees of the total circumference of the pipe 110 can establish a complementary reference region. Preferably, the combined angular coverage of the first half circumference 112 and the second half circumference 114 equaling 360 degrees of the pipe 110, ensuring complete circumferential coverage while maintaining distinct measurement and reference zones. Preferably, the first half circumference 112 and the second half circumference 114 each are 180 degrees of the total circumference of the pipe 110.

The fluid imaging system 100 further includes optical heads 120 distributed along an exterior wall of the first half circumference 112. In some embodiments, the optical heads 120 are each oriented substantially perpendicular to the exterior wall of the first half circumference 112.

In an embodiment, the optical heads 120 are collimating optical heads. The collimating functionality ensures controlled beam characteristics as required for accurate measurement implementation. Each collimating optical head 120 is configured to deliver controlled beam parameters including defined working distance (e.g., 5-15 millimeters), spot size (e.g., 50-100 micrometers), and numerical aperture (e.g., 0.12-0.25). This collimation characteristic of the optical heads 120 enables consistent measurement performance across the fluid volume while maintaining signal quality and spatial resolution.

The optical heads 120 are preferably oriented such that all of the optical heads are equally spaced and oriented radially at the same axial position of the pipe 110. In other embodiments the optical heads are equally spaced radially and axially along the pipe 110. In other embodiments the optical heads are arranged such that all of the beam axis of each optical head are parallel.

The fluid imaging system 100 further includes a light source 130 configured to emit a source light. Herein, the fluid imaging system 100 incorporates the light source 130 configured to generate controlled source light with specific spectral and temporal characteristics. For example, the light source 130 can include a superluminescent diode (SLED), a tunable laser source or the like. In a non-limiting example SLED configuration operates at a center wavelength of 1550 nanometers with a spectral bandwidth of 60 nanometers, delivering 200 milliwatts of optical power with spectral power density exceeding 3.0 milliwatts per nanometer. For tunable laser implementations, the light source 130 provides wavelength control synchronized with measurement timing. The spectral characteristics of the light source 130 are specifically selected to enable high-resolution measurement capability while maintaining compatibility with standard optical components and industrial deployment requirements.

In some embodiments, the fluid imaging system 100 includes a power divider 132 configured to divide the source light substantially equally for the optical heads 120. The power divider 132 may incorporate optical splitting ratios to divide the source light from the light source 130 substantially equally among all the optical heads 120. The power divider 132 maintains controlled splitting ratios while reducing insertion losses to improve system efficiency. This equal power distribution ensures consistent measurement sensitivity across all measurement positions along the first half circumference 112. The implementation of the power divider 132 enables scalability of the fluid imaging system 100 through accommodation of varying numbers of the optical heads 120 while preserving equal power distribution characteristics.

The fluid imaging system 100 further includes a timing circuit 140 including an optical switch 142 and configured to serially activate the optical heads 120 via the optical switch 142, resulting in one active optical head at a time. Herein, the timing circuit 140 enables temporal control over optical measurement sequencing. The optical switch 142, integrated in the timing circuit 140, is specifically configured to enable controlled activation of the optical heads 120 in a defined serial sequence e.g. along the first half circumference 112. This configuration ensures that only one optical head 120 remains active during each measurement interval, enabling systematic scanning across the measurement region. The timing circuit 140 coordinates the switching sequence with data acquisition timing to maintain measurement synchronization.

In present implementations, the timing circuit 140 is configured to serially activate the optical heads 120 so that a series of localized regions along the first half circumference 112 of the pipe 110 are imaged. The timing circuit 140 executes a controlled activation sequence for the optical heads 120, enabling systematic measurement coverage across the first half circumference 112 of the pipe 110. This sequential activation generates a series of localized measurement regions, with each optical head 120 capturing data from its corresponding measurement volume when activated. The timing circuit 140 maintains temporal coordination between activation of the optical head 120, operation of the light source 130, and data acquisition systems (as discussed later in the description). This synchronized operation enables construction of comprehensive cross-sectional images through sequential sampling of multiple localized regions. The measurement sequence implements controlled timing intervals for flow measurement requirements while maintaining data acquisition efficiency. For standard implementations, the timing circuit 140 is configured to achieve measurement rates of 1-10 kilohertz across the defined measurement regions, enabling effective monitoring of fluid dynamics within the pipe 110.

The fluid imaging system 100 further includes a fiber circulator 150 configured to direct the source light to the one active optical head 120 and collect reflected light from the pipe 110 and the at least one fluid therein. Herein, the fiber circulator 150 is configured to enable bidirectional optical signal routing between the light source 130 and the optical heads 120. The fiber circulator 150 implements optical path control to direct the source light from the light source 130 through the optical switch 142 to the one active optical head 120. The fiber circulator 150 additionally collects and routes reflected light generated through interaction with the pipe 110 and the at least one fluid contained therein. The optical architecture of the fiber circulator 150 maintains signal isolation between transmitted and reflected optical paths while reducing insertion losses.

Herein, in particular, the one active optical head 120 is configured to receive the source light from the fiber circulator 150, illuminate a corresponding localized region of the pipe 110, and direct the reflected light to the fiber circulator 150. That is, during operation of the fluid imaging system 100, each optical head 120 when activated by the timing circuit 140 functions as the one active optical head. This active optical head 120 receives the source light transmitted through the fiber circulator 150 and projects this light onto a corresponding localized region of the pipe 110. The illumination geometry established by the active optical head 120 creates a defined measurement volume within the corresponding localized region. The active optical head 120 then collects reflected light generated through interaction with the pipe 110 and fluid interfaces within the measurement volume, directing this reflected light back through the fiber circulator 150 for subsequent analysis.

In some embodiments, the fluid imaging system 100 further includes a coating 116 formed over an exterior wall of the second half circumference 114 and configured to absorb infrared light. The coating 116 extends across the full angular range of the second half circumference 114, typically spanning 170-190 degrees of the total circumference of the pipe 110. The coating 116 is specifically configured to absorb infrared radiation at the operating wavelength of the light source 130. The coating 116 can provide controlled absorption characteristics to reduce unwanted reflections from the opposing wall of the pipe 110. This configuration enhances measurement sensitivity by reducing optical noise from multiple reflections within the pipe 110.

Preferably, at least one portion of the coating 116 includes one or more infrared reflective marks or portions. The infrared reflective marking may be used as a reference or signal point to identify, for example, the position of the pipe 110 corresponding with a particular optical head. Preferably, the infrared reflective marking is one or more horizontal or vertical lines or combination thereof, where no individual line represents more than 2-5% of the illuminated or spot area corresponding with the optical head.

The fluid imaging system 100 further includes a detector 160 configured to receive the reflected light from the fiber circulator 150 and generate spectral data. The detector 160 can generate detailed spectral data characterizing the reflected light signals, enabling subsequent analysis of fluid interfaces and flow characteristics within the pipe 110. The spectral data generated by the detector 160 may further undergo subsequent Fourier transform (FFT) processing to reconstruct the dielectric distributions along measurement diameters within the pipe 110. For example, the detector 160 can enable measurement resolution determined by the relationship:

$$z_{max} = \lambda_0^2 / (2n\delta\lambda),$$

where '$z_{max}$' Represents Maximum Measurable Depth, '$\lambda_0$' Denotes Central Wavelength, 'n' Indicates refractive index, and '$\delta\lambda$' represents resolution bandwidth.

The fluid imaging system 100 further includes a controller 170 configured to process the spectral data by a Fourier-transform algorithm to provide a cross-sectional analysis of multi-phase fluid flow of the at least one fluid along the pipe 110. Herein, the controller 170 is configured to execute specialized signal processing algorithms for analysis of spectral data generated by the detector 160. The controller 170 applies Fourier-transform processing to convert wavelength-domain interferogram data into spatial domain information characterizing fluid distributions within the pipe 110. The processing sequence implemented by the controller 170 can include: wavelength-to-frequency domain conversion of raw interferogram data, linear interpolation to achieve uniform frequency spacing, and Fast Fourier Transform (FFT) computation. This processing can enable reconstruction of cross-sectional fluid distributions with spatial resolutions of 2-30 micrometers (e.g. 2 µm, 5 µm, 10 µm, 12 µm, 15 µm, 20 µm, 25 µm, 30 µm or any values therebetween) axially and 10-40 micrometers (e.g. 10 µm, 15 µm, 20 µm, 25 µm, 30 µm, 35 µm, 40 µm or any values therebetween) laterally. The controller 170 can achieve processing latency below 100 milliseconds (e.g. 90 milliseconds, 50 milliseconds, 30 milliseconds, 10 milliseconds, 5 milliseconds or any values therebetween) and total system response time under 250 milliseconds (e.g. 240 milliseconds, 200 milliseconds, 150 milliseconds, 100 milliseconds, 50 milliseconds, 30 milliseconds, 10 milliseconds, or any values therebetween), enabling real-time analysis of fluid flow dynamics.

In an embodiment, as illustrated in FIG. 1, the fluid imaging system 100 implements a configuration where the light source 130 includes a superluminescent diode (SLED) (herein, referred by the reference numeral 130). The SLED 130 is configured to emit incoherent light or partially coherent light as the source light. In a non-limiting example, the SLED 130 may be configured to operate at 1550 nanometer center wavelength with 60 nanometer spectral bandwidth. This configuration utilizing the SLED 130 (as the light source) generates partially coherent illumination with 200 milliwatt output power and spectral power density exceeding 3.0 milliwatts per nanometer. The detector 160 includes an optical spectrum analyzer (OSA) (herein, referred by the reference numeral 160). The OSA 160 can be configured to operate with a 0.02 nanometer resolution bandwidth. This configuration with the OSA 160 (as the detector) enables detailed spectral analysis of reflected signals, supporting measurement of diameters up to 6 centimeters for the pipe 110, while maintaining high spatial resolution.

Figure 2:
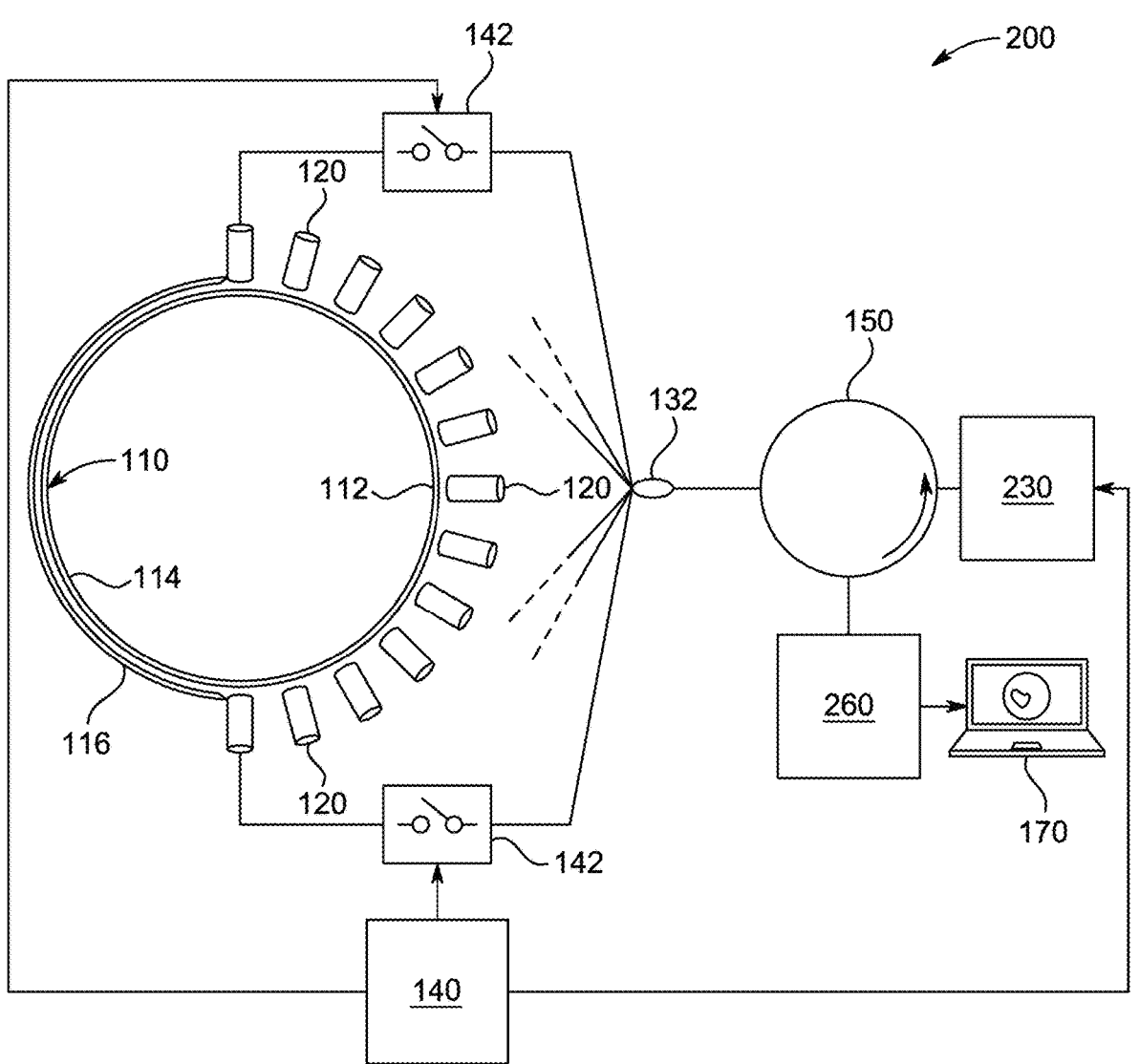
FIG. 2 is an exemplary schematic diagram of a fluid imaging system incorporating a swept laser source and photodetector configuration, according to a second embodiment.

Referring now to FIG. 2, illustrated is a fluid imaging system (herein referred by reference numeral 200), according to a second embodiment of the present disclosure. The fluid imaging system 200 implements an alternative configuration for cost-effective operation while maintaining measurement capabilities. The fluid imaging system 200 includes a tunable laser source (referred by reference numeral 230), as the light source, configured to generate wavelength-swept illumination across a controlled spectral range e.g. centered at 1550 nanometers. Herein, the tunable laser source 230 may operate with sweep rates of 1-10 kilohertz, synchronized through timing circuit 140 to coordinate with optical head activation sequences. The wavelength sweep characteristics of the tunable laser source 230 can achieve an axial resolution of 2-30 micrometers (e.g. 2 µm, 5 µm, 10 µm, 12 µm, 15 µm, 20 µm, 25 µm, 30 µm or any values therebetween) and a lateral resolution of 10-40 micrometers (e.g. 10 µm, 15 µm, 20 µm, 25 µm, 30 µm, 35 µm, 40 µm or any values therebetween) in the measurement volume. In this implementation, the detector includes a photodetector (referred by reference numeral 260) for synchronous operation with the tunable laser source 230. The photodetector 260 implements high-speed detection with bandwidth matched to the sweep rate of the tunable laser source 230, typically operating at sampling rates of 100-200 megasamples per second. This synchronized detection scheme enables direct measurement of interference signals generated through interaction with fluid interfaces within the pipe 110.

The fluid imaging system 200 maintains the distributed optical head configuration of the first embodiment, with the optical heads 120 positioned along the first half circumference 112 of the pipe 110. The timing circuit 140 implements coordination between the wavelength sweep of the tunable laser source 230, activation timing of the optical heads 120 through the optical switch 142, and data acquisition by the photodetector 260. The fiber circulator 150 maintains identical routing functionality to the first embodiment, directing swept-wavelength illumination to the active optical heads 120 and collecting reflected signals for detection. The second half circumference 114 incorporates the infrared-absorbing coating 116 matched to the operating wavelength range of the tunable laser source 230. The controller 170 implements modified signal processing algorithms designed for direct time-domain detection of interference signals, while maintaining equivalent cross-sectional analysis capabilities for multi-phase fluid flow characterization. This configuration achieves measurement capabilities comparable to the SLED/OSA implementation of the fluid imaging system 100 while reducing system complexity and component costs through elimination of the optical spectrum analyzer. The embodiment of the fluid imaging system 200 is similar to the embodiment of the fluid imaging system 100. Note that similar or identical components in the present disclosure are labeled with similar or identical numerals unless specified otherwise. Descriptions that have been provided may be omitted for simplicity purposes.

Figure 3:
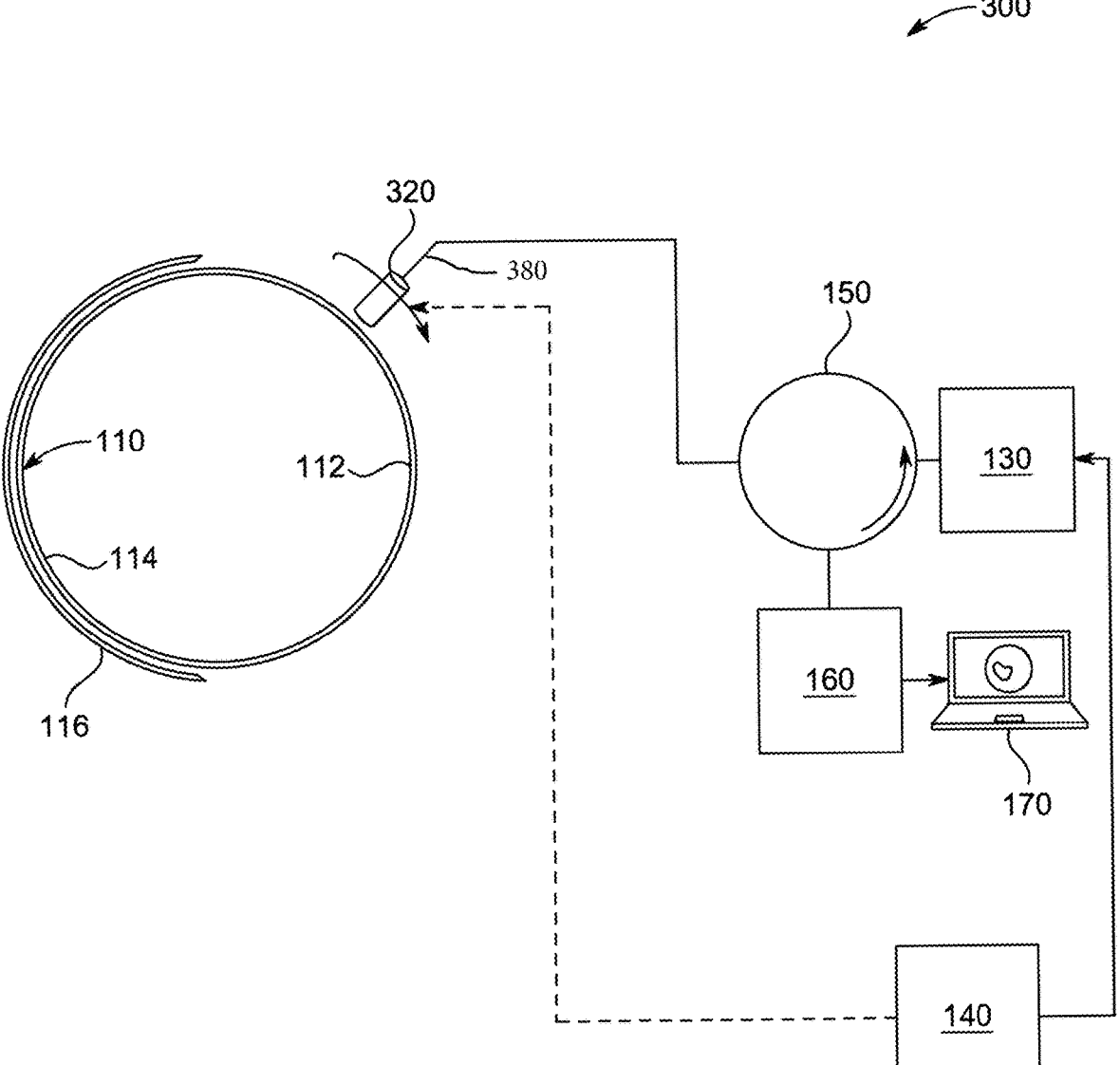
FIG. 3 is an exemplary schematic diagram of a fluid imaging system incorporating mechanical scanning with a single optical head, according to a third embodiment.

Referring now to FIG. 3, illustrated is a fluid imaging system (herein referred by reference numeral 300), according to a third embodiment of the present disclosure. The fluid imaging system 300 implements a mechanically-scanned configuration utilizing a single optical head for moderate flow speed applications. The fluid imaging system 300 includes a single optical head (referred by reference numeral 320) positioned over an exterior wall of first half circumference 112 of pipe 110. The fluid imaging system 300 also includes a robotic arm (referred by reference numeral 380) configured to move the optical head 320 along the exterior wall of the first half circumference 112. The robotic arm 380 implements mechanical positioning to enable controlled scanning motion of the optical head 320. The robotic arm 380 is configured to move the optical head 320 along the exterior wall of the first half circumference 112 so that a series of localized regions along the first half circumference 112 of the pipe 110 are imaged. Specifically, the robotic arm 380 is configured to move the optical head 320 along the exterior wall of the first half circumference 112 and make stops at a series of locations along the exterior wall of the first half circumference 112 so as to image the series of localized regions. This configuration is particularly suited for applications with moderate fluid flow speeds where real-time capture of rapid flow dynamics is not critical.

The fluid imaging system 300 utilizes the SLED 130, as the light source, configured to emit the source light for measurement operations. The fiber circulator 150 is config-ured to direct the source light to the optical head 320 and collect reflected light from the pipe 110 and the at least one fluid therein. Further, the fluid imaging system 300 utilizes the OSA 160, as the detector, configured to receive the reflected light from the fiber circulator 150 and generate spectral data characterizing fluid interfaces within the pipe 110. The controller 170 is configured to process the spectral data by a Fourier-transform algorithm to provide cross-sectional analysis of multi-phase fluid flow of the at least one fluid along pipe 110.

In the fluid imaging system 300, the angular resolution of measurements is determined by the angular step size of the robotic arm 380 when positioning the optical head 320. The mechanical scanning implementation maintains measure-ment capabilities comparable to the distributed optical head configurations while reducing system complexity through utilization of the single optical head 320. It may be noted that, herein, the azimuthal resolution is determined by the angular step of the scanning system provided by the robotic arm 380. The present implementation utilizing the SLED 130 and the OSA 160 provides an axial resolution of 2-30 micrometers (e.g. 2 μm, 5 μm, 10 μm, 12 μm, 15 μm, 20 μm, 25 μm, 30 μm or any values therebetween) through broad spectral bandwidth, enhanced measurement stability through partially coherent illumination characteristics, direct spectral domain measurement capabilities eliminating mechanical scanning requirements, and ability to analyze pipes with diameters up to 10 centimeters (e.g. 10 cm, 8 cm, 6 cm, 4 cm, 2 cm, 1 cm, 0.5 mm, 0.1 mm or any values therebetween) while maintaining spatial resolution specifi-cations.

Figure 4:
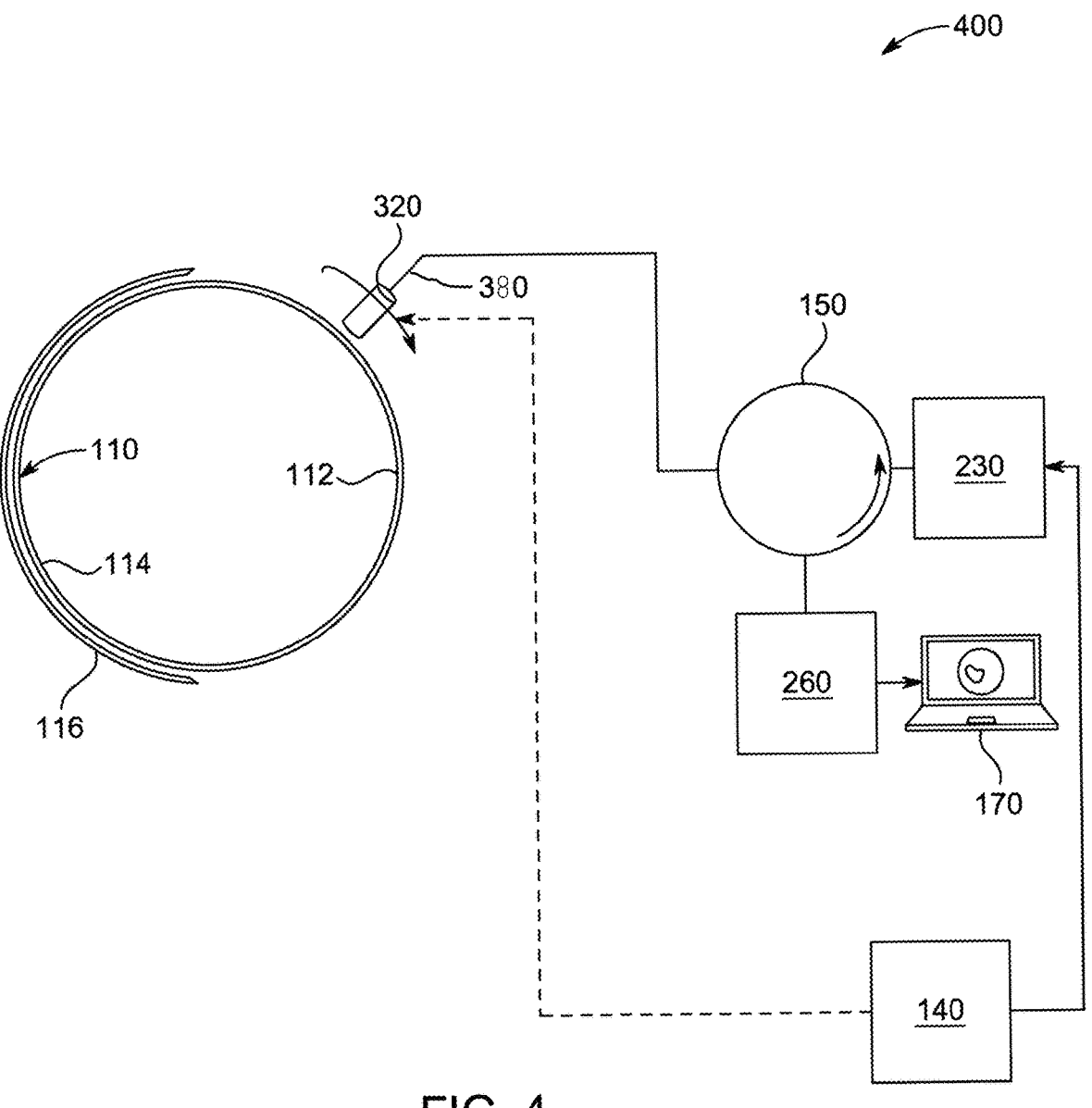
FIG. 4 is an exemplary schematic diagram of a fluid imaging system combining mechanical scanning with spectral measurements using a partially coherent light source and optical spectrum analyzer, according to a fourth embodiment.

Referring now to FIG. 4, illustrated is a fluid imaging system (herein referred by reference numeral 400), accord-ing to a fourth embodiment of the present disclosure. The fluid imaging system 400 implements a mechanically-scanned configuration utilizing the single optical head 320 positioned over an exterior wall of first half circumference 112 of the pipe 110, for moderate flow speed applications. The fluid imaging system 400 also includes the robotic arm 380 configured to move the optical head 320 along the exterior wall of the first half circumference 112. The robotic arm 380 implements mechanical positioning to enable controlled scanning motion of the single optical head 320. The robotic arm 380 is configured to move the optical head 320 along the exterior wall of the first half circumference 112 so that a series of localized regions along the first half circum-ference 112 of the pipe 110 are imaged. Specifically, the robotic arm 380 is configured to move the optical head 320 along the exterior wall of the first half circumference 112 and make stops at a series of locations along the exterior wall of the first half circumference 112 so as to image the series of localized regions. This configuration is particularly suited for applications with moderate fluid flow speeds where real-time capture of rapid flow dynamics is not critical.

The fluid imaging system 400 utilizes the tunable laser source 230, as the light source, configured to emit source light for measurement operations. The fiber circulator 150 is configured to direct the source light to the optical head 320 and collect reflected light from the pipe 110 and the at least one fluid therein. Further, the fluid imaging system 400 utilizes the photodetector 260, as the detector, configured to receive the reflected light from the fiber circulator 150 and generate spectral data characterizing fluid interfaces within the pipe 110. The controller 170 is configured to process the spectral data by a Fourier-transform algorithm to provide cross-sectional analysis of multi-phase fluid flow of the at least one fluid along the pipe 110.

In the fluid imaging system 400, the angular resolution of measurements is determined by the angular step size of the robotic arm 380 when positioning the optical head 320. The mechanical scanning implementation maintains measure-ment capabilities comparable to the distributed optical head configurations while reducing system complexity through utilization of the single optical head 320. It may be noted that, herein, the azimuthal resolution is determined by the angular step of the scanning system provided by the robotic arm 380. The present implementation utilizing the tunable laser source 230 and the photodetector 260 provides enhanced cost reduction compared to the fluid imaging system 300, while maintaining equivalent measurement resolution through synchronization between wavelength sweeping and mechanical scanning. The direct time-domain detection scheme enabled by the photodetector 260 simpli-fies signal processing requirements while achieving an axial resolution of 2-30 micrometers (e.g. 2 μm, 5 μm, 10 μm, 12 μm, 15 μm, 20 μm, 25 μm, 30 μm or any values therebe-tween) and a lateral resolution of 10-40 micrometers (e.g. 10 μm, 15 μm, 20 μm, 25 μm, 30 μm, 35 μm, 40 μm or any values therebetween).

Figure 5:
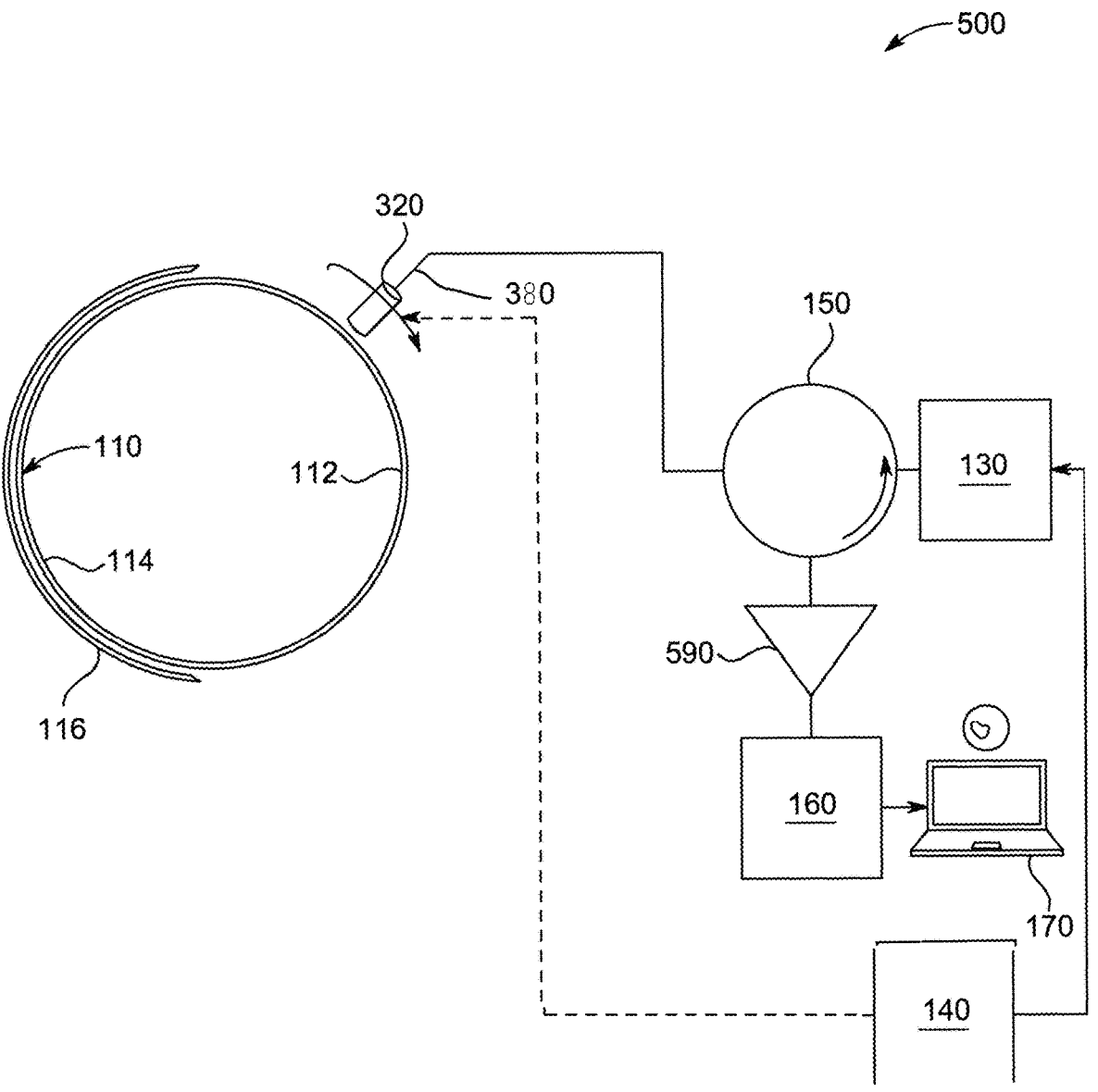
FIG. 5 is an exemplary schematic diagram of a fluid imaging system incorporating a semiconductor optical amplifier (SOA), according to a fifth embodiment.

Referring now to FIG. 5, illustrated is a fluid imaging system (herein referred by reference numeral 500), accord-ing to a fifth embodiment of the present disclosure. The fluid imaging system 500 implements an enhanced signal-to-noise configuration through strategic integration of optical amplification for applications involving larger pipe diam-eters where thermal noise effects become significant. The fluid imaging system 500 includes a semiconductor optical amplifier (SOA) (referred by reference numeral 590) opti-cally positioned between the fiber circulator 150 and the detector 160 (or 260) to provide controlled signal amplifi-cation of reflected measurement signals. The SOA 590 is configured for operation at the measurement wavelength regime. In an alternate configuration, the optical amplifier is an erbium-doped fiber amplifier (EDFA) with a central wavelength that matches the center wavelength of the light source 130 and the detector 160. For example, the SOA 590 can have operating wavelength of about 1550±30 nanome-ters, matched to the light source 130 (or 230); small signal gain of about ≥20 decibels; noise figure of about ≤7 decibels; and saturation output power of about ≥10 dBm.

When implementing the SLED 130 (as the light source), the fluid imaging system 500 utilizes the OSA 160 (as the detector) for spectral analysis. The SOA 590 enhances weak reflection signals while maintaining spectral characteristics essential for interferometric measurement. For implementations utilizing the tunable laser source 230 (as the light source), the fluid imaging system 500 employs the photodetector 260 (as the detector) operating synchronously with wavelength sweeping. In this configuration, the SOA 590 amplifies time-varying interference signals while preserving phase relationships critical for accurate measurement. In other words, the SOA 590 can be used in the embodiments of FIGS. 1, 2 and/or 4.

The integration of the SOA 590 enables measurement of larger diameter pipes by compensating for optical losses that increase with measurement depth. More specifically, the SOA 590 can maintain high measurement sensitivity across increased pipe diameters where signal attenuation becomes significant. The SOA 590 can maintain the aforementioned spatial resolution specifications while extending the measurable pipe diameter beyond the standard 6-centimeter limitation to e.g. 10 cm, 15 cm or more. The positioning of the SOA 590 ensures amplification occurs after initial interference signal generation, improving signal-to-noise ratio while reducing potential degradation of measurement accuracy.

In general, referring to FIG. 1 through FIG. 5, the fluid imaging systems 100-500 implement Fourier Domain Optical Coherence Tomography (FD-OCT) configured for cross-sectional imaging of fluid flow within the pipe 110. The fluid imaging systems 100-500 can achieve an axial resolution of 2-30 micrometers (e.g. 2 μm, 5 μm, 10 μm, 12 μm, 15 μm, 20 μm, 25 μm, 30 μm or any values therebetween) and a lateral resolution of 10-40 micrometers (e.g. 10 μm, 15 μm, 20 μm, 25 μm, 30 μm, 35 μm, 40 μm or any values therebetween), enabling detailed analysis of fluid properties within the pipe 110. The fluid imaging systems 100-500 can enable non-invasive multiphase flow analysis in applications including petrochemical processing, water treatment, and chemical manufacturing. Laboratory validation demonstrates measurement capabilities through experimental testing using water-air mixtures in glass pipe 110 configurations. Hereinafter, the discussions below will use the fluid imaging system 100 as an example for illustrative purposes and are applicable to the fluid imaging systems 100-400 as a skilled artisan would understand.

The fluid imaging system 100 includes the light source 130 including the superluminescent diode (SLED) operating at a central wavelength with a bandwidth around the central wavelength. The central wavelength can range from 400 nm to 10 μm, preferably 600 nm to 1 μm, preferably 1000 nm to 5000 nm, preferably 1500 nm to 3000 nm. The bandwidth can be 1-1000 nm, preferably 10-500 nm, preferably 50-100 nm. Preferably, the central wavelength is 1550±2 nanometers with the bandwidth being 60±2 nanometers. The multiple optical heads 120 are positioned along the first half circumference 112 of the pipe 110, in which the optical heads 120 are configured to emit source light into pipe 110 and collect reflected light. The fluid imaging system 200 alternatively implements the tunable laser source 230, as the light source, operating with 1-10 kilohertz sweep rates. The timing circuit 140 enables control of the optical switch 142 to coordinate activation of the optical heads 120. For the fluid imaging systems 300, 400, the robotic arm 380 implements mechanical positioning of the single optical head 320 along the first half circumference 112 of the pipe 110. Further, the fiber circulator 150 directs the source light to the active optical heads 120, 320 and routes reflected light to the detector 160, 260. For the fluid imaging system 100, the detector 160 incudes the OSA operating with 0.02 nanometer resolution bandwidth. For the fluid imaging system 200, the photodetector 260 is implemented as the detector, operating at 100-200 megasamples per second. The fluid imaging system 500 may further incorporate the SOA 590 between the fiber circulator 150 and the detector 160, 260. The SOA 590 provides≥20 decibels gain at 1550±30 nanometers, enabling measurement of diameters for the pipe 110 exceeding 6 centimeters. The controller 170 implements Fourier-transform algorithms processing spectral data to reconstruct dielectric distributions with processing latency below 100 milliseconds. The fluid imaging systems 100-500 maintain adaptable configuration through: multiple fixed optical heads 120 or a single scanning optical head 320 with the robotic arm 380; the SLED 130 with the OSA 160, or the tunable light source 230 with the photodetector 260; and optionally the SOA 590 for enhanced sensitivity.

In operation of the fluid imaging system 100, the timing circuit 140 activates the optical switch 142 to select the active optical head 120, whereupon the fiber circulator 150 directs the source light from the light source 130 to the active optical head 120. Herein, the optical switches 142 are controlled by the controller 170, implementing a digital signal processor (DSP), for synchronization with the acquisition rate of the optical spectrum analyzer 160 or the sweeping rate of the tunable laser source 230. The active optical head 120 transmits the source light into the pipe 110 and collects reflected light generated through interaction with the pipe 110 and the at least one fluid therein. The reflected light, containing information about dielectric properties of the at least one fluid within a cross-section of the pipe 110, is directed by the fiber circulator 150 to the detector 160. The detector 160 generates an interferogram from the reflected light, which the controller 170 processes using Fourier-transform algorithms to reconstruct dielectric distribution along a diameter of the pipe 110. The timing circuit 140 sequentially activates each optical head 120 to enable comprehensive analysis of flow profiles within the pipe 110.

In some embodiments, the controller 170 is configured to provide visualization of flow structures, boundary layers, a dielectric constant distribution or a combination thereof. The controller 170 implements comprehensive analysis capabilities to extract detailed flow characteristics from processed measurement data. The analysis functions of controller 170 provide visualization of multiple flow parameters, including structural features such as phase boundaries and interface positions within the measurement volume. The controller 170 enables mapping of boundary layer formations at fluid interfaces with micrometer-scale resolution. Additionally, the controller 170 reconstructs dielectric constant distributions across pipe cross-sections through analysis of reflection amplitudes and positions.

Figure 6:
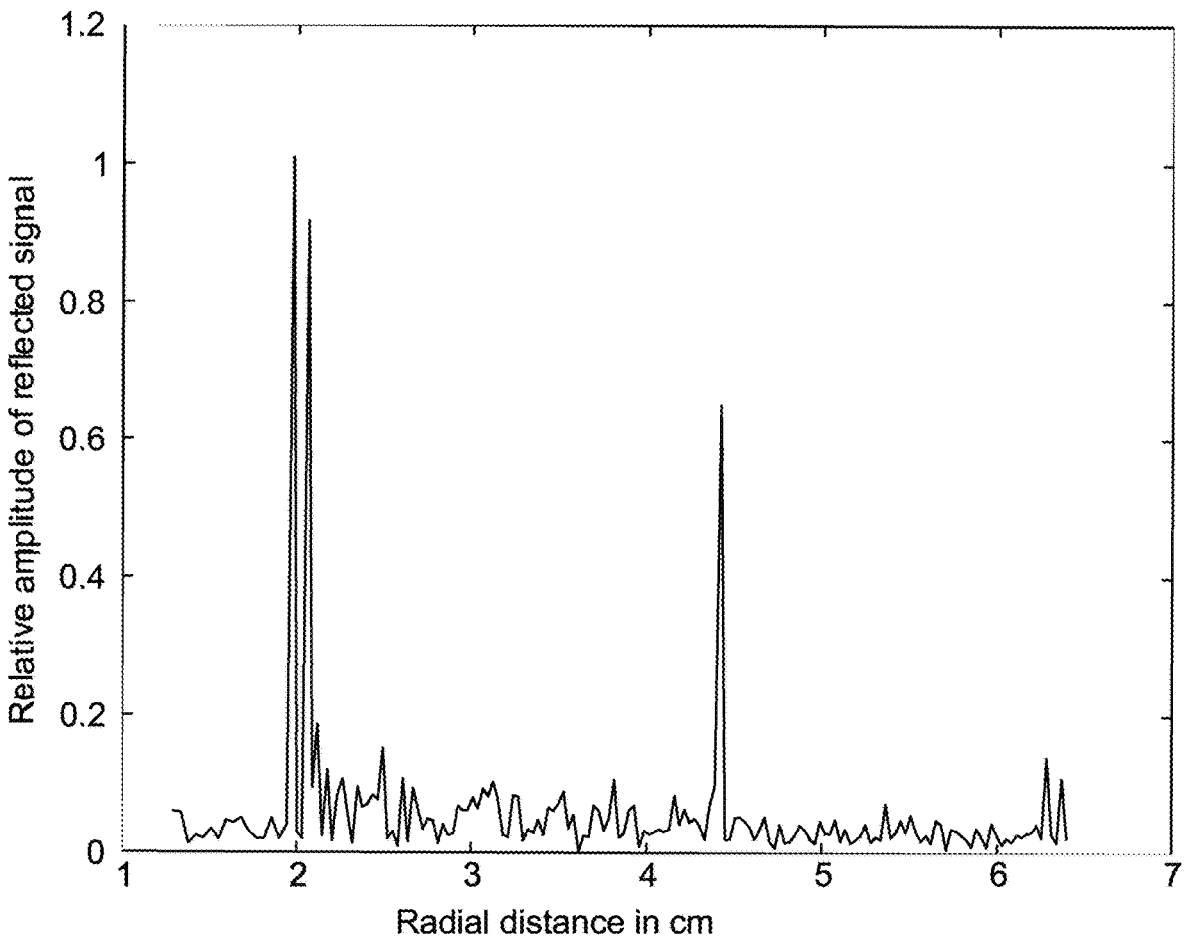
FIG. 6 is an exemplary graph presenting experimental results for the fluid imaging system showing Fast Fourier Transform (FFT) analysis of captured interferogram data, according to certain embodiments.

Referring to FIG. 6, illustrated are experimental validation results from implementation of the fluid imaging system 100, demonstrating Fast Fourier Transform (FFT) analysis of captured interferogram data. The experimental validation implemented the light source 130 configured to emit the source light with 200 milliwatt output power, 60 nanometer spectral bandwidth centered at 1550 nanometers. The experimental configuration positioned the optical head 120 adjacent to the pipe 110, in which the pipe 110 included glass material oriented horizontally and partially filled with water.

Further, the detector 160 included the optical spectrum analyzer (OSA) configured with 0.02 nanometer resolution bandwidth, enabling measurement depth ($z_{max}$) according to the relationship:

$$z_{max} = \lambda_0^2/(2n\delta\lambda)$$

where $\lambda_0$ represents central wavelength and 8% denotes OSA resolution bandwidth. This configuration enabled measurement capability for the pipe 110 with diameter up to 6 centimeters.

The controller 170 implemented signal processing including wavelength-to-frequency domain conversion of interferogram data, linear interpolation for uniform frequency spacing, and Fast Fourier Transform computation. The FFT analysis results presented in FIG. 6 demonstrate detection of multiple interfaces within the pipe 110. The first FFT peak corresponded to reflection from the exterior wall of the pipe 110, representing initial interaction between the source light and the pipe 110. The second FFT peak indicated reflection from the interior wall-air interface within the pipe 110. A third FFT peak demonstrated detection of the air-water interface within the partially filled pipe 110. Additional weak signals corresponded to reflections from the opposite wall of the pipe 110. The infrared-absorbing coating 116 on the second half circumference 114 absorbed remaining optical signals, reducing interference effects.

For experimental validation using a water-air mixture in a glass pipe, the controller 170 successfully identified and characterized multiple interfaces including: an exterior pipe wall (0 millimeter reference position), an interior wall-air interface (1.5 millimeter position), an air-water interface (variable position), and opposing wall interfaces (25 millimeter nominal position). The experimental results validated measurement capability of the fluid imaging system 100 for detecting and characterizing multiple interfaces within the pipe 110, enabling detailed analysis of fluid distribution and flow characteristics through non-invasive optical measurement. The FFT analysis demonstrated capability to resolve distinct material boundaries while maintaining measurement sensitivity across the pipe 110. This multi-parameter analysis capability enables comprehensive characterization of fluid dynamics and composition within the pipe 110.

The fluid imaging system 100-500 of the present disclosure implements multiple technical features enabling measurement capability. The optical heads 120 are distributed along the first half circumference 112 of the pipe 110, while the second half circumference 114 incorporates the infrared-absorbing coating 116 to reduce unwanted reflections. For the fluid imaging system 300, 400, the robotic arm 380 implements mechanical positioning of the single optical head 320 along the first half circumference 112. The fluid imaging system 500 incorporates the semiconductor optical amplifier 590 to enhance measurement capability for larger diameter pipes. The timing circuit 140 implements synchronized control of the optical switch 142 coordinated with operation of the detector 160, 260. The power divider 132 implements controlled distribution of the source light to the optical heads 120.

The fluid imaging system 100-500 provides measurement capabilities for industrial fluid flow monitoring applications. The controller 170 processes spectral data to provide visualization of flow structures, boundary layers, and dielectric constant distribution within pipe 110. These measurement capabilities enable detailed characterization of multiphase fluid flows in petrochemical processing applications for monitoring pipeline flows and separator operation. The fluid imaging system 100-500 additionally enables monitoring of pharmaceutical process flows for mixture uniformity analysis, water treatment system monitoring for phase separation characterization, and chemical reactor analysis for flow dynamics improvement.

The fluid imaging system 100-500 implements adaptable measurement architecture supporting multiple industrial process monitoring applications. The measurement capabilities include: flow analysis in petrochemical processing with pipe diameters up to 6 centimeters, water treatment monitoring with spatial resolution of 12-15 micrometers axially and 25-30 micrometers laterally, and chemical manufacturing process characterization with temporal resolution below 250 milliseconds. The integration of multiple measurement technologies within the fluid imaging system 100-500 can enable sustained measurement accuracy across operational temperature ranges of 10-90° C. and relative humidity ranges of 0-100%. The fluid imaging system 100-500 can implement comprehensive analysis capabilities for characterizing fluid dynamics and composition within the pipe 110, enabling quantitative monitoring of flow parameters including velocity ranges of 0.1-10 meters per second and refractive index ranges of 1.0-1.6.

The fluid imaging system 100-500 provides specific technical advantages compared to conventional measurement systems. The timing circuit 140 enables measurement speeds exceeding conventional capacitance-based systems through implementation of synchronized optical switching with rates of 1-10 kilohertz. The controller 170 provides visualization of flow structures and boundary layers through Fourier-transform processing of spectral data with latency below 100 milliseconds. The optical heads 120, 320 enable non-invasive measurement through exterior mounting on the pipe 110 while maintaining measurement capability in industrial environments. The fluid imaging system 100-500 accommodates varying pipe diameters through implementation of semiconductor the optical amplifier 590 providing gain exceeding 20 decibels.

Figure 7:
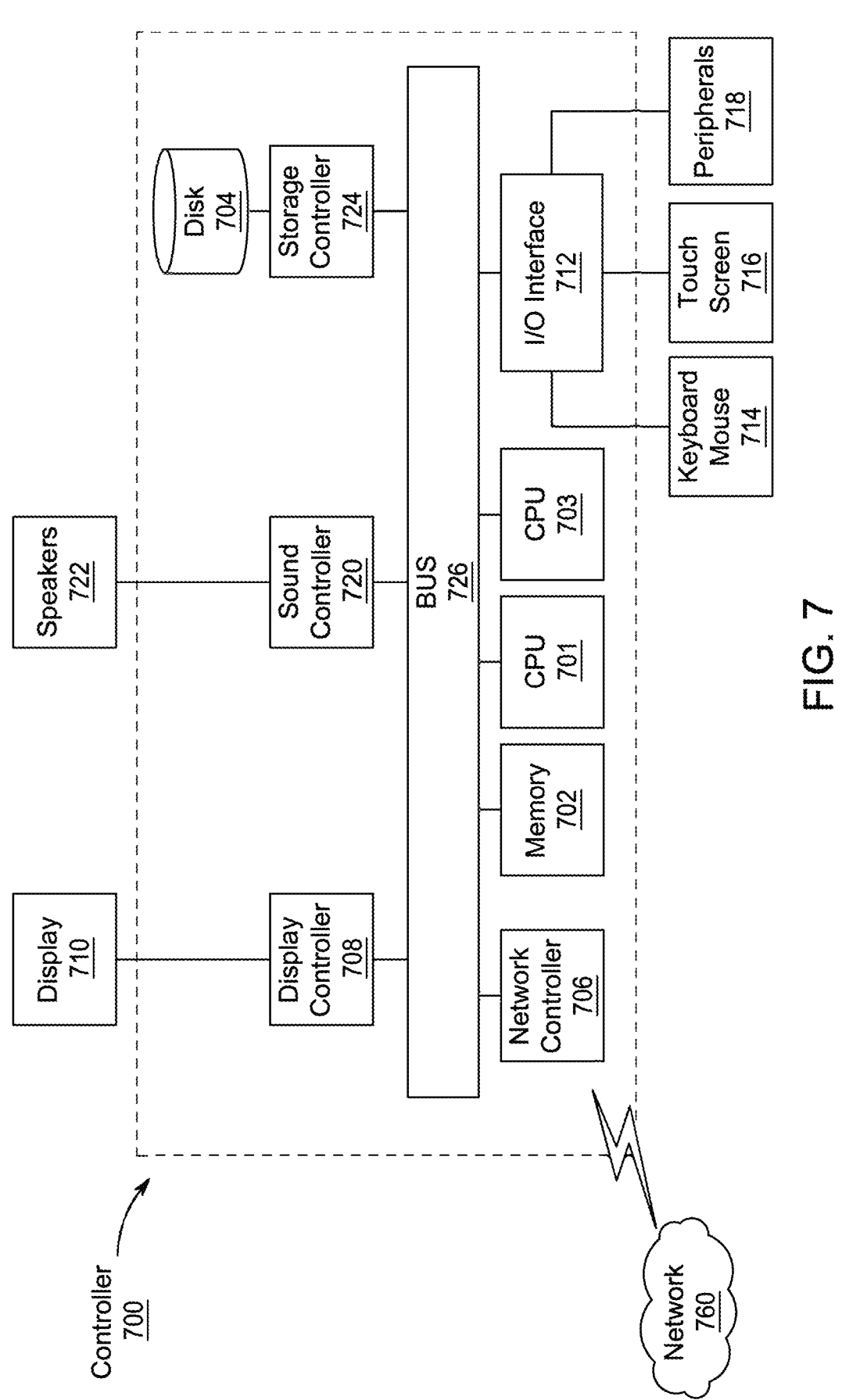
FIG. 7 is an illustration of a non-limiting example of details of computing hardware used in the computing system, according to certain embodiments.

Next, further details of the hardware description of a computing environment according to exemplary embodiments is described with reference to FIG. 7. In FIG. 7, a controller 700 is described is representative of the controller 170 of the present fluid imaging system 100-500 to control operations of various electrical components therein, in which the controller 700 is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
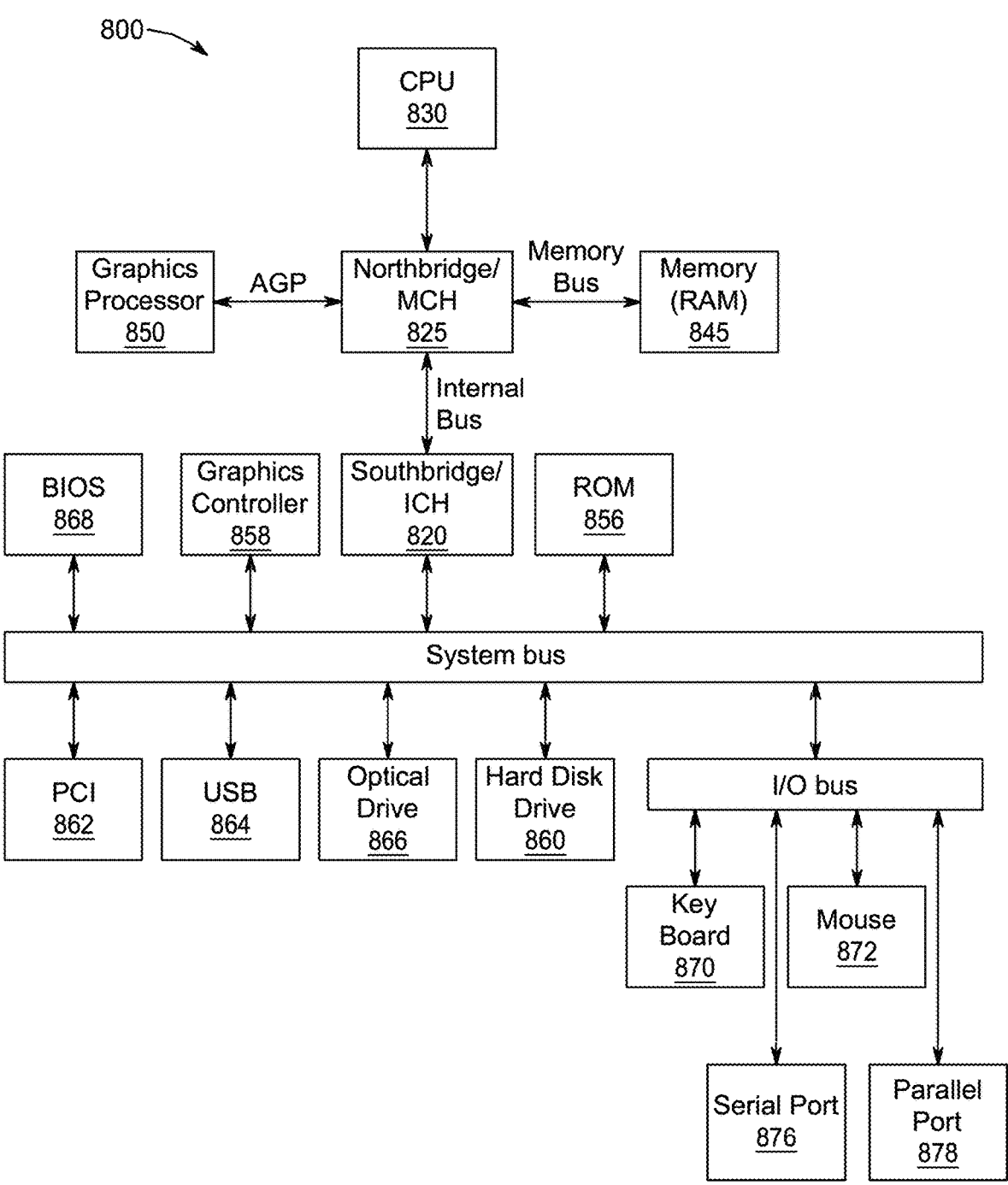
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
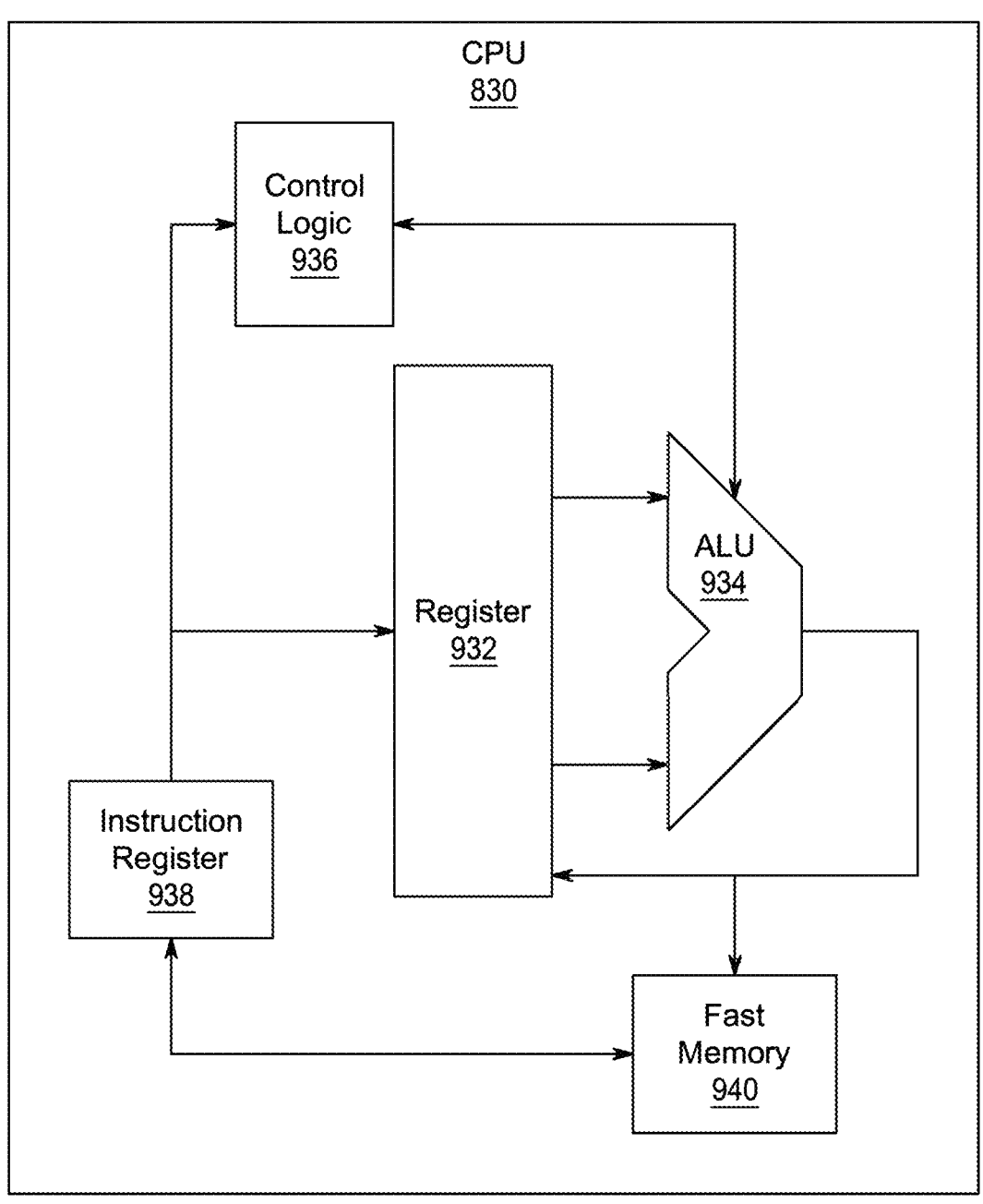
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 10:
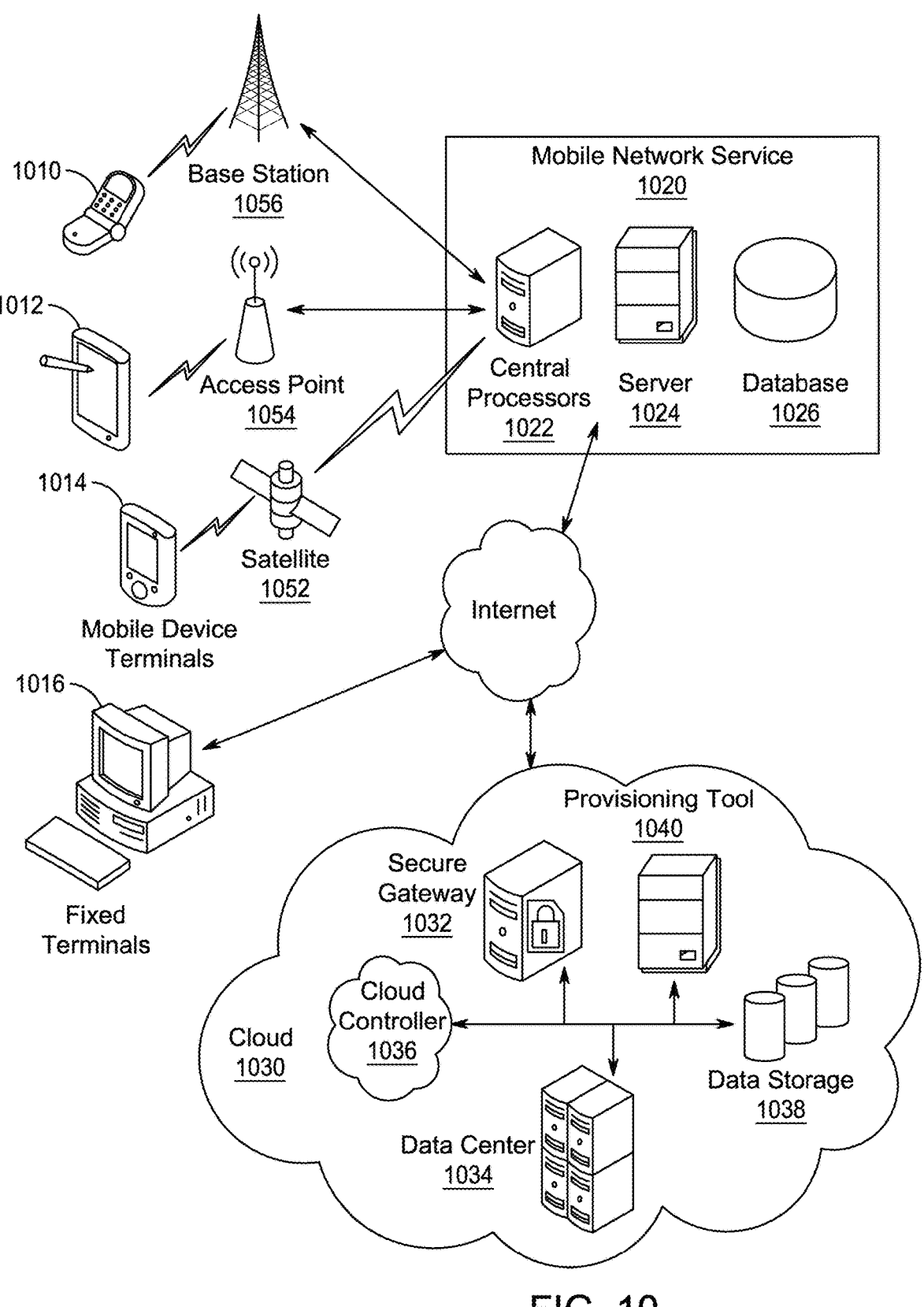
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1030 including a cloud controller 1036, a secure gateway 1032, a data center 1034, data storage 1038 and a provisioning tool 1040, and mobile network services 1020 including central processors 1022, a server 1024 and a database 1026, which may share processing, as shown by FIG. 10, in addition to various human interface and communication devices (e.g., display monitors 1016, smart phones 1010, tablets 1012, personal digital assistants (PDAs) 1014). The network may be a private network, such as a LAN, satellite 1052 or WAN 1054, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

While specific embodiments of the invention have been described, it should be understood that various modifications and alternatives may be implemented without departing from the spirit and scope of the invention. For example, different cellular automata rules or encryption algorithms could be employed, or alternative feature extraction and face recognition techniques could be integrated into the system.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A fluid imaging system, comprising:
a pipe configured to receive at least one fluid therein and having a substantially circular circumference including a first half circumference and a second half circumference;
optical heads distributed along an exterior wall of the first half circumference;
a light source configured to emit a source light;
a timing circuit comprising an optical switch and configured to serially activate the optical heads via the optical switch, resulting in one active optical head at a time;
a fiber circulator configured to direct the source light to the one active optical head and collect reflected light from the pipe and the at least one fluid therein;
a detector configured to receive the reflected light from the fiber circulator and generate spectral data; and
a controller configured to process the spectral data by a Fourier-transform algorithm to provide a cross-sectional analysis of multi-phase fluid flow of the at least one fluid along the pipe, wherein an entirety of a length of the pipe forms a closed loop having a substantially circular shape.

2. The fluid imaging system of claim 1, wherein:
the one active optical head is configured to receive the source light from the fiber circulator, illuminate a corresponding localized region of the pipe, and direct the reflected light to the fiber circulator.

3. The fluid imaging system of claim 2, wherein:
the timing circuit is configured to serially activate the optical heads so that a series of localized regions along the first half circumference of the pipe are imaged.

4. The fluid imaging system of claim 1, wherein:
the first half circumference and the second half circumference of the pipe are opposite to each other.

5. The fluid imaging system of claim 4, wherein:
the first half circumference is 170-190 degrees of the pipe,
the second half circumference is 170-190 degrees of the pipe, and
the first half circumference and the second half circumference together are 360 degrees of the pipe.

6. The fluid imaging system of claim 1, wherein:
the optical heads are each oriented substantially perpendicular to the exterior wall of the first half circumference.

7. The fluid imaging system of claim 1, wherein:
the optical heads are collimating optical heads.

8. The fluid imaging system of claim 1, wherein:
the light source comprises a superluminescent diode (SLED) configured to emit incoherent light or partially coherent light as the source light, and
the detector comprises an optical spectrum analyzer.

9. The fluid imaging system of claim 1, wherein:
the light source comprises a tunable laser source, and
the detector comprises a photodetector.

10. The fluid imaging system of claim 1, wherein:
the at least one fluid comprises air and a liquid, and
the pipe comprises glass.

11. The fluid imaging system of claim 1, wherein:
the controller is configured to provide visualization of flow structures, boundary layers, a dielectric constant distribution or a combination thereof.

12. The fluid imaging system of claim 1, further comprising:
a coating formed over an exterior wall of the second half circumference and configured to absorb infrared light.

13. The fluid imaging system of claim 1, further comprising:
a power divider configured to divide the source light substantially equally for the optical heads.

14. The fluid imaging system of claim 1, further comprising:
a semiconductor optical amplifier (SOA) optically positioned between the fiber circulator and the detector.

15. The fluid imaging system of claim 1, wherein:
the optical heads are all positioned in a common plane.

16. The fluid imaging system of claim 1, wherein:
the optical heads and the pipe are positioned in a common plane.

17. The fluid imaging system of claim 1, wherein:
the entirety of the length of the pipe has a ring or donut shape.

* * * * *